(12) United States Patent
Kareisto et al.

(10) Patent No.: US 10,164,334 B2
(45) Date of Patent: Dec. 25, 2018

(54) ANTENNA SYSTEM CALIBRATION (71) Applicant: Nokia Solutions and Networks Oy, Espoo (FI)

(72) Inventors: Jukka Kareisto, Kempele (FI); Eero Olavi Heikkinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 408 days.

(21) Appl. No.: 14/784,409

(22) PCT Filed: Apr. 15, 2013

(86) PCT No.: PCT/EP2013/057779
§ 371 (c)(1),
(2) Date: Oct. 14, 2015

(87) PCT Pub. No.: WO2014/169934
PCT Pub. Date: Oct. 23, 2014

(65) Prior Publication Data
US 2017/0324161 A1 Nov. 9, 2017

(51) Int. Cl.
| | |
|---|---|
| H01Q 3/26 | (2006.01) |
| H04B 17/21 | (2015.01) |
| G01S 7/40 | (2006.01) |
| H01Q 9/04 | (2006.01) |
| G06F 17/10 | (2006.01) |
| H01P 5/18 | (2006.01) |
| H01Q 3/22 | (2006.01) |

(Continued)

(52) U.S. Cl.
CPC .............. *H01Q 3/267* (2013.01); *G01S 7/40* (2013.01); *H01Q 9/0457* (2013.01); *H04B 17/21* (2015.01); *G06F 17/10* (2013.01); *H01P 5/18* (2013.01); *H01Q 3/22* (2013.01); *H04B 7/043* (2013.01); *H04L 2027/0026* (2013.01)

(58) Field of Classification Search
CPC .................................. H01Q 3/267; G01S 7/40
USPC .......................................... 342/165, 173, 174
See application file for complete search history.

(56) References Cited

U.S. PATENT DOCUMENTS

| | | | |
|---|---|---|---|
| 7,982,664 B1 * | 7/2011 | Uscinowicz | H01Q 3/267 |
| | | | 342/165 |
| 8,193,971 B2 * | 6/2012 | Vook | H04B 17/21 |
| | | | 342/165 |

(Continued)

FOREIGN PATENT DOCUMENTS

| | | |
|---|---|---|
| EP | 2 270 923 A1 | 1/2011 |
| FR | 2 848 302 | 6/2004 |

*Primary Examiner* — Marcus E Windrich
(74) *Attorney, Agent, or Firm* — Harrington & Smith (57) ABSTRACT

A method for antenna calibration is disclosed, the method including driving calibration signals for antenna array beam calibration to an antenna array feeder line in a transceiver front end unit by using one or more directional couplers and/or radio frequency probes, wherein calibration signal paths are integrated inside the transceiver front end unit. Measurements are carried out on the calibration signals, between different antenna combinations inside the antenna array. Based on collected measurement data, calibration information is calculated for each measurement branch of the antenna array by using a mathematical formula. Active antenna array beam calibration is then performed based on the calculated calibration information.

25 Claims, 6 Drawing Sheets

(51) Int. Cl.
*H04B 7/0426* (2017.01)
*H04L 27/00* (2006.01)

(56) References Cited

U.S. PATENT DOCUMENTS

| | | | | |
|---|---|---|---|---|
| 8,199,048 | B1* | 6/2012 | Medina Sanchez | G01S 7/4004 342/174 |
| 8,842,040 | B1* | 9/2014 | Dorsey | H01Q 3/267 342/174 |
| 8,897,717 | B2* | 11/2014 | Ferguson | H01Q 3/267 342/173 |
| 8,907,842 | B1* | 12/2014 | Bianchini | H04B 1/525 342/159 |
| 2006/0033655 | A1 | 2/2006 | Quievy | 342/174 |
| 2008/0012748 | A1* | 1/2008 | Ahn | H01Q 3/267 342/21 |
| 2009/0027258 | A1* | 1/2009 | Stayton | G01S 7/4026 342/174 |
| 2010/0073220 | A1* | 3/2010 | Olesen | H04B 17/14 342/174 |
| 2012/0050094 | A1* | 3/2012 | Nakabayashi | G01S 7/03 342/174 |
| 2012/0139776 | A1* | 6/2012 | Malmqvist | H01Q 3/267 342/174 |
| 2012/0293362 | A1* | 11/2012 | Liang | H01Q 3/2605 342/174 |

* cited by examiner

ANTENNA SYSTEM CALIBRATION

FIELD OF THE INVENTION

The exemplary and non-limiting embodiments of this invention relate generally to wireless communications networks, and more particularly to antenna system calibration.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Wideband communication systems, such as LTE systems, have a significantly wider bandwidth than in previous wireless systems. The LTE system supports the application of multiple antenna techniques, e.g. MIMO and beam forming. A beam forming algorithm normally assumes that an antenna array has no errors and that its multi-channel transceiver has an identical transfer function for each transceiver chain. However, due to mechanical and electrical variations in the radio frequency components such as amplifiers, mixers and cables, the spatial signature of a baseband receive/transmit signal may be different from an actual radio frequency receive/transmit signal. As a result, transfer functions of the radio frequency transceivers may differ from each other, i.e. amplitude, time and phase deviations may appear between different antenna branches. Thus, it is important to perform antenna calibration to compensate the deviations between the different antenna branches to achieve an expected antenna gain.

SUMMARY

The following presents a simplified summary of the invention in order to pro-vide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatus, computer program product, and a computer-readable storage medium as defined in the independent claims. Further embodiments of the invention are disclosed in the dependent claims.

An aspect of the invention relates to a method for antenna calibration in communications, comprising driving calibration signals for antenna array beam calibration to an antenna array feeder line in a transceiver front end unit by using one or more directional couplers and/or radio frequency probes, wherein calibration signal paths are integrated inside the transceiver front end unit; carrying out measurements on the calibration signals between different antenna combinations inside the antenna array; based on collected measurement data, calculating calibration information for each measurement branch of the antenna array by using a mathematical formula; performing active antenna array beam calibration based on the calculated calibration information.

A further aspect of the invention relates to an apparatus comprising an arrangement for coupling a first antenna and a second antenna, a receiver operationally coupled to the first antenna, and a transmitter operationally coupled to the second antenna, wherein the transmitter being configured to drive calibration signals for antenna array beam calibration to an antenna array feeder line in a transceiver front end unit by using one or more directional couplers and/or radio frequency probes, wherein calibration signal paths are integrated inside the transceiver front end unit; the receiver being configured to carry out measurements on the calibration signals between different antenna combinations inside the antenna array; based on collected measurement data, calculate calibration information for each measurement branch of the antenna array by using a mathematical formula; and perform active antenna array beam calibration based on the calculated calibration information.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

A still further aspect of the invention relates to a transceiver comprising such an apparatus.

A still further aspect of the invention relates to a network element comprising such a transceiver.

A still further aspect of the invention relates to a user equipment comprising such a transceiver.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

An exemplary embodiment relates to a structure of active antenna beam calibration between separate antennas and antenna arrays without external antennas or other reflective elements. More precisely, in an exemplary embodiment, at a certain point of a structure, located inside of a TRX front end module, it is possible to perform active antenna array calibrations both ways without any external antennas or reflective elements outside of a TRX radio module. TRX refers to a transmitter-receiver, i.e. a transceiver.

An exemplary embodiment enables simplifying the structure required at the active antenna arrays calibration and increasing the integration level of components required. Based on exemplary structures, no extra antennas, nor components outside of an active electronic module, are needed to perform the active antenna arrays calibration. An exemplary structure may be completely implemented inside an active antenna front end module.

In existing structures for active antenna system calibration, the calibrations are based on separate antennas or reflective elements located outside of the transceiver electronic module. In existing structures, the purpose of external antennas or of any reflective elements is to send or receive a required calibration signal at an active antenna system beam calibration. In existing solutions, the external antennas or reflective elements make electrical and mechanical implementation more complicated. This has an effect that reliability of the design degrades and overall costs of the required calibration structure increases.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any network element, user terminal, server, corresponding component, and/or to any communication system or any combination of different communication systems that support antenna calibration. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In an exemplary embodiment, active antennas and antenna arrays may be internally self-calibrated without external antennas or reflective elements outside of a main radio module. In an exemplary structure, calibration signals used at beam calibration may be driven to an antenna array feeder line inside of a transceiver module. In an exemplary embodiment, the calibration process may use same antennas as normal transmission receiver modes are using. This functionality may be implemented inside the TRX front end module by using different combinations of directional couplers or RF (radio frequency) probes and also by using a power amplifier protection circulator third output port. In an exemplary embodiment, each path required may be integrated inside the radio module, and external components are no longer needed for the calibration process. The calibration process may be based on a large amount of measurements between different antenna combinations inside the antenna array. The calibration information for each branch may be calculated at collected data by using a mathematical formula.

Figure 4:
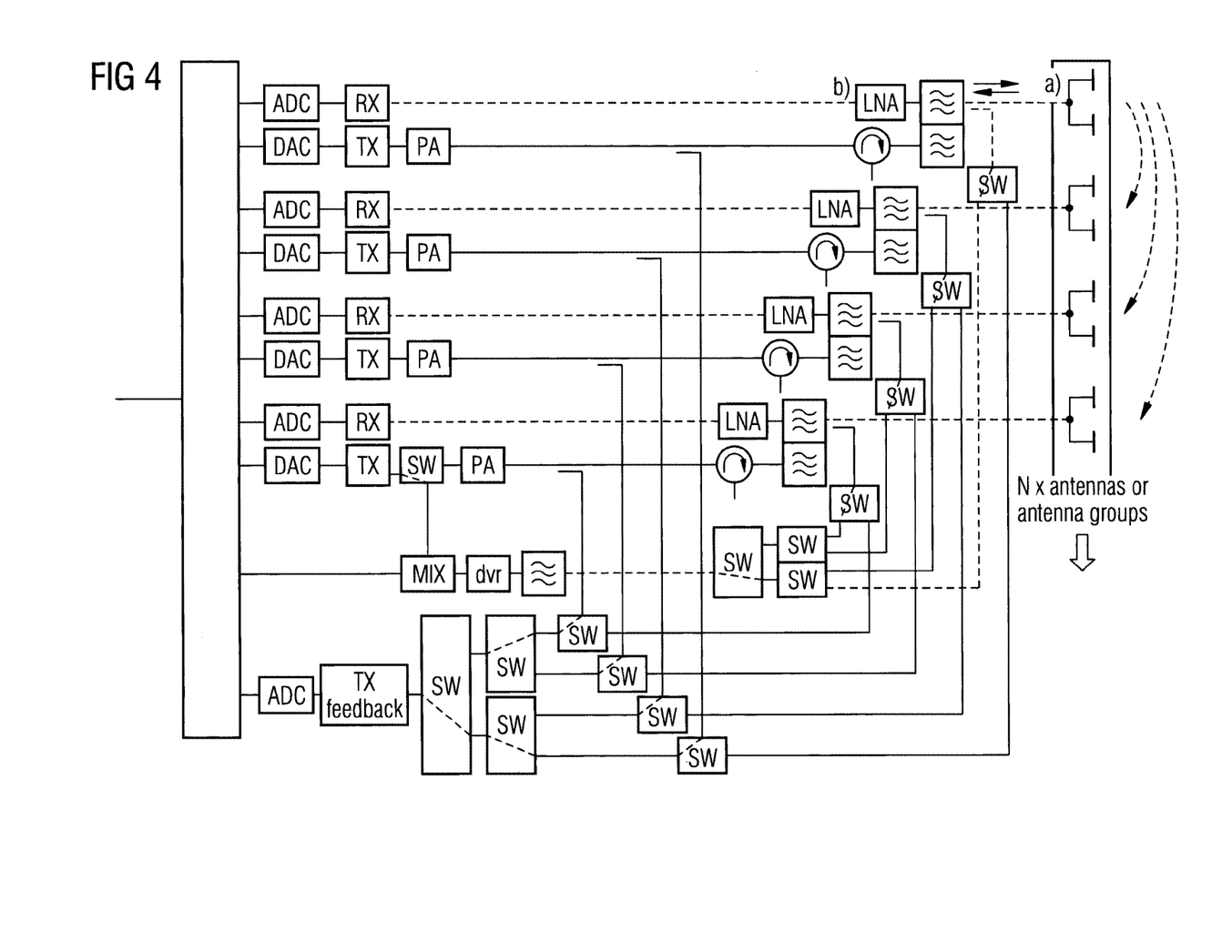
FIG. 4 illustrates an active antenna array RX signal calibration between signal sources to other receiving antennas.

FIG. 4 illustrates an active antenna array RX (receiver) signal calibration between signal sources to other receiving antennas. In an exemplary calibration system, the active antennas or antenna arrays may be self-calibrated without external antennas or reflective elements. An implementation for a RX signal path is illustrated in FIG. 4, showing how, for example, a four elements active antenna group may be RX calibrated internally without external components. A dashed line shows how one antenna is sending the RX calibration signal, and other three antennas are receiving the same signal. This process may be repeated for each of the four antennas at the time, so different variations between antennas may become calibrated. FIG. 4 shows an exemplary implementation that is based on a RF probe design at a TX/RX filter output area. The number of separate antennas or antenna arrays is not limited in this kind of calibration system.

Figure 5:
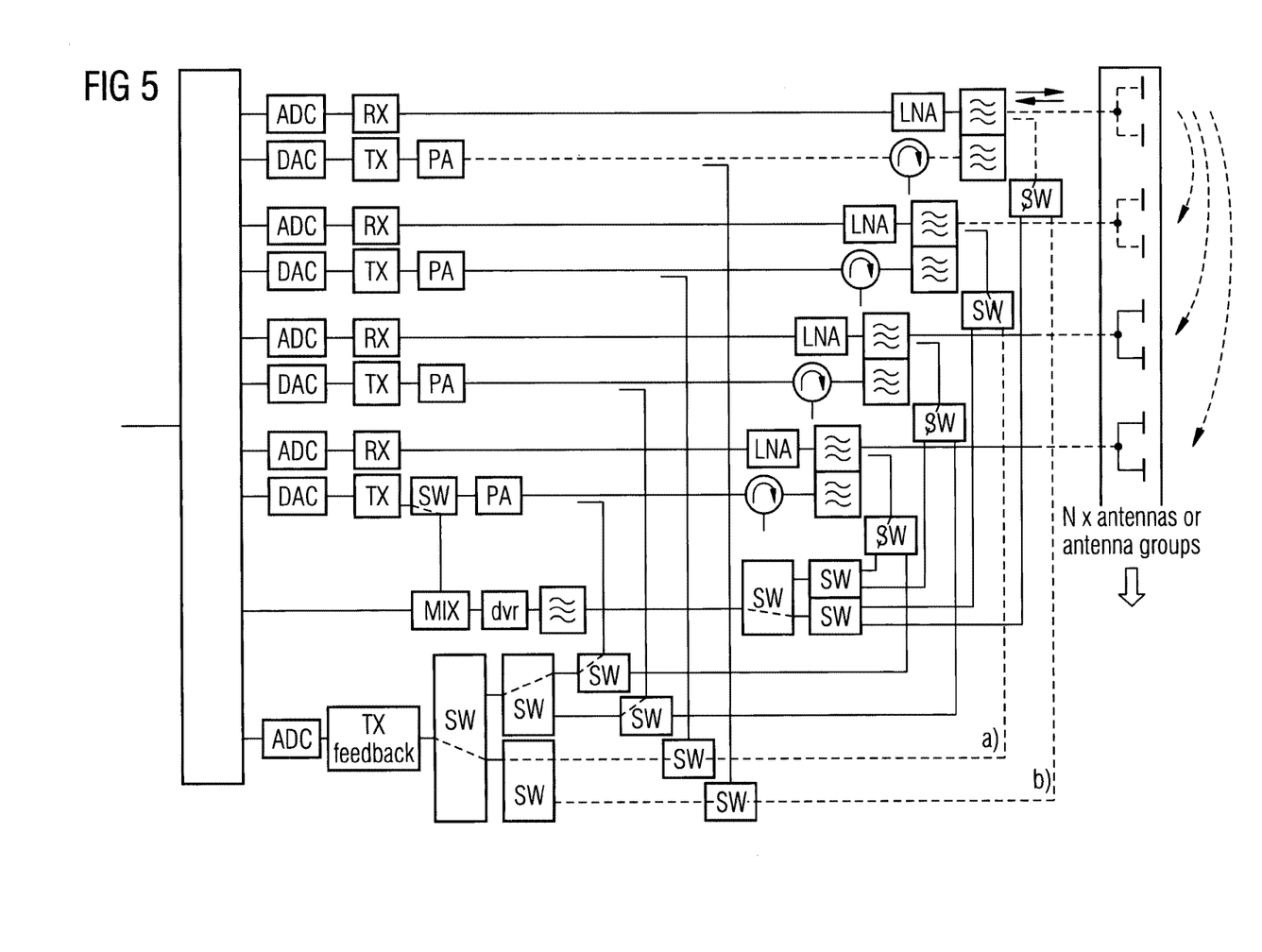
FIG. 5 illustrates an active antenna array TX signal calibration between signal sources to other receiving antennas.

FIG. 5 illustrates an active antenna array TX (transmitter) signal calibration between signal sources to other receiving antennas. The TX calibration process resembles the RX calibration process. One power amplifier is sending a calibration signal at the time, and other antennas or antenna arrays are receiving the signal one at the time. An exemplary implementation for a TX signal path is illustrated in FIG. 5. A dashed line shows the TX signal path from PA to the (one) antenna that is sending the calibration signal. Other three antennas are receiving this same calibration signal. This process may be repeated, for example, for each of the four antennas at the time, so different variations between antennas may become calibrated. FIG. 5 shows an exemplary implementation that is based on an integrated RF probe design at the TX/RX filter output area. The number of the separate antennas or antenna arrays is not limited in this kind of calibration system.

In a HW implementation, there are two possible ways to implement the calibrations without any external antennas or reflective elements.

Figure 1:
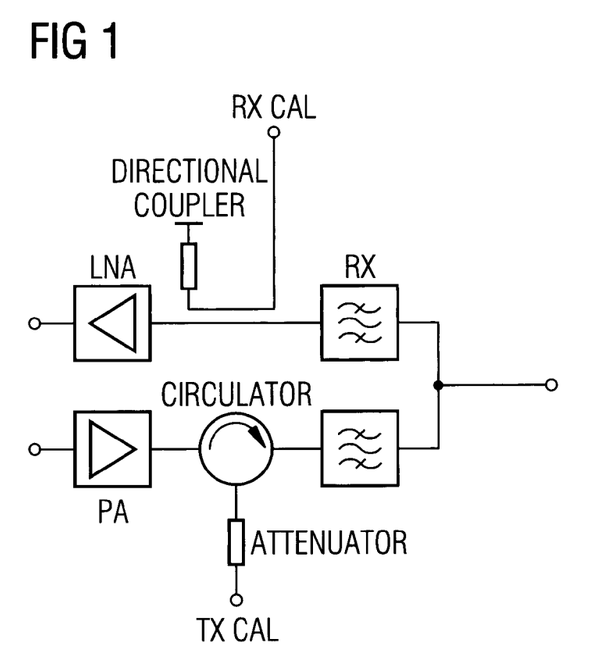
FIG. 1 illustrates a calibration arrangement where TX and RX calibration signals are connected via separate signal lines at active antenna beam calibration.

FIG. 1 illustrates a calibration structure where TX and RX calibration signals are connected via separate signal lines at active antenna beam calibration. According to a first exemplary embodiment, one possible way to implement an integrated calibration function at the active antenna design is to use separate lines inside of the front end TRX unit for the TX and RX calibration signals. In this type of the calibration, the RX signal may be driven to a receiver chain via a RF probe or a directional coupler that is located between a RX filter and LNA (low noise amplifier). At a TX chain, the TX calibration signal is taken to a PA circulator third port. In this type of implementation, each part needed for the both ways RF calibration is integrated to the TRX radio module. FIG. 1 illustrates a general structure of this type of calibration HW implementation.

Figure 2:
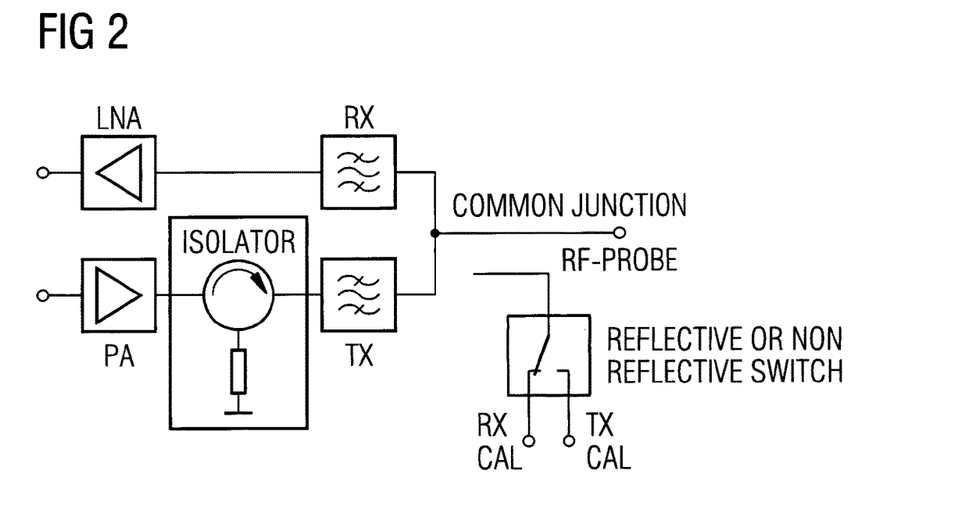
FIG. 2 illustrates a calibration arrangement where TX and RX calibration signals are connected at the active antenna via a single common point, wherein the calibration arrangement is based on a RF probe design.
Figure 3:
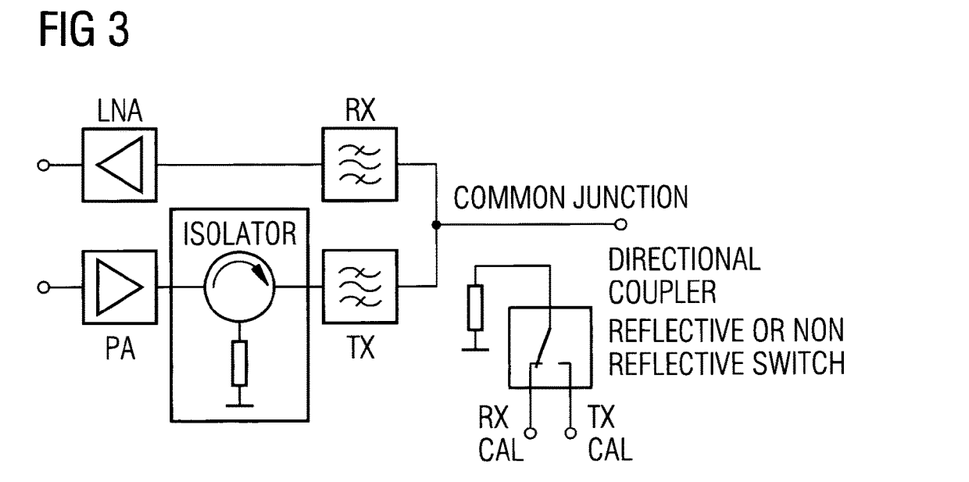
FIG. 3 illustrates a calibration arrangement where TX and RX calibration signals are connected at the active antenna via a single common point, wherein the calibration arrangement is based on a RF directional coupler design.

If compared the above described HW (hardware) implementation where both TX and RX calibration signals are using own elements and lines, another possible HW implementation structure according to a second exemplary embodiment uses only one common directional coupler or RF probe that is connected via a switch to the TX and RX calibration sources. In this RX chain structure, a RX frequency insertion loss is 0.1 dB-0.2 dB lower, because the coupler is not any more needed between LNA and the RX filter. The lower insertion loss means significantly better base station sensitivity. This implementation also improves LNA and filter integration, because no extra components or structures are needed between LNA and the RX filter. In the second exemplary embodiment, a separate circulator and power attenuator may be replaced by one isolator with an internal 50 ohm load. This type of structure is simple, and no extra matching is needed, because the isolator is already tested by manufacturers against specifications. An isolator based design is also a more cost effective solution if compared to a circulator based design. These structures are illustrated in FIGS. 2 and 3 (FIG. 2 illustrates a calibration structure where TX and RX calibration signals are connected at the active antenna via a single common point, wherein the calibration structure is based on a RF probe design; FIG. 3 illustrates a calibration structure where TX and RX calibration signals are connected at the active antenna via a single common point, wherein the calibration structure is based on a RF directional coupler design).

An exemplary embodiment enables active antenna calibration without any external antennas or reflective elements outside of the TRX front end module. An exemplary embodiment enables a more simple integrated calibration design, while at the same time being a cost effective solution.

Thus, an integrated active antenna array beam calibration method is disclosed for calibration of active antennas or antenna arrays. The method may involve TX and RX chain self-diagnostic as well as integrated signal monitoring.

TRX may be a transceiver such as the one in a base station or in user equipment. A multiplier may combine signal parts and feed the combined signal to an amplifier unit. The amplifier unit passes the signal to be transmitted towards an antenna. A coupler may be coupled between the amplifier unit and the antenna. The coupler may sample a part of a radio frequency signal traveling between the amplifier unit and the antenna for a converter. After the converter the signal may be amplified and filtered. A coupler may be a directional coupler used to couple either a part of a signal traveling in the direction from an amplifier unit towards the antenna or a part of a signal reflected from the antenna or from a connector of the antenna traveling in the direction from the antenna towards the amplifier unit. A measuring unit may receive a radio frequency signal and measure a strength of the radio frequency signal. The strength may be measured as a power or as an absolute amplitude. The analog DC signal can be transformed to a digital format by an analogue-to-digital converter. The amplifier may include a power amplifier PA which amplifies the signal to be transmitted. A power supply to the power amplifier may be a parameter to be controlled and hence the power amplifier may obtain its operational voltage from a power supply unit, which may be controllable.

In the following, different embodiments will be described using, as an example of a system architecture whereto the embodiments may be applied, an architecture based on LTE/LTE-A network elements, without restricting the embodiment to such an architecture, however. The embodiments described in these examples are not limited to the LTE/LTE-A radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

An exemplary active antenna system (AAS) may be based on a separate transmitter/receiver path where it is possible to know the delay, amplitude and phase exactly, wherein AAS features may be based on phase, amplitude and delay manipulation for given signals (baseband carrier IQ samples).

The transmitter/receiver may include many components that have component-level dynamic and static phase, amplitude and delay variations. An exemplary AAS is able to measure and correct the impact of the component variations.

In an exemplary embodiment, a calibration system HW is provided where calibration signal injection and detection is in a right position. In an exemplary embodiment, this kind of HW enables enough separate measurements to be done to solve each unknown variable in the calibration equation group.

In an exemplary embodiment, there is no need for extra radios, antennas, connections or probes (except the one described in the drawing) to achieve full calibration of the AAS system. The calibration system described here according to an exemplary embodiment is very inexpensive.

The exemplary AAS system may have a beam-forming and calibration functionality, independent transmitter/receiver modules.

In an exemplary embodiment, within the transmitter/receiver modules there may be components to inject and detect the calibration signal. The calibration signals may be generated in a common calibration function. In addition to normal signal paths, HW components for the calibration apparatus may include: a probe/coupler which inject and isolate calibration signal form main traffic signal; a switch system to route an isolated calibration signal to a predistortion feedback receiver; a converter to convert RX calibration signal to a right RF channel and switch the signal to the probe/coupler; and a calibration function that may be done by using a processor, FPGA fabric, ASIC, or a combination of those. An exemplary implementation is a processor—FPGA combination which may also have other functions such as beam-forming.

In an exemplary embodiment, the calibration function configures transmitter/receiver function to a desired single measurement. Then the calibration function starts execution of the measurement. When the calibration signals arrive the calibration function, then the calibration function takes a correlation between measured signals.

A next calibration function may configure a next set of measurements and execute that. When a necessary amount of measurements (and correlations) are ready, then the calibration function solves a calibration equation. From that calibration equation, the calibration function calculates required corrections for each transmitter/receiver and for each signal in those paths. The corrections may then be used to correct each traffic signal phase, amplitude and delay.

Mathematically, the calibration signal may be a kind of signal that is not correlating with a normal BS traffic signal but is having good features for the calibration measurements. Suitable coding may include, for example, a WCDMA gold code, a Walsh code, a Kazakh code, a and pseudo random noise code, as well.

An exemplary embodiment allows normal operational usage of the AAS system during an on-going calibration process.

Figure 6:
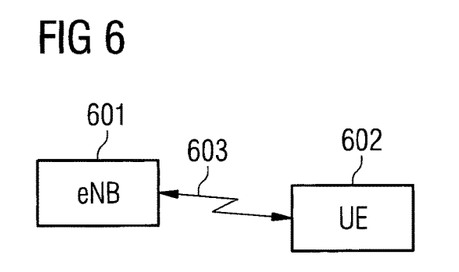
FIG. 6 shows a simplified block diagram illustrating exemplary system architecture.

A general architecture of a communication system is illustrated in FIG. 6. FIG. 6 is a simplified system architecture only showing some elements and functional entities, all being logical units whose implementation may differ from what is shown. The connections shown in FIG. 6 are logical connections; the actual physical connections may be different. It is apparent to a person skilled in the art that the systems also comprise other functions and structures. It should be appreciated that the functions, structures, elements and the protocols used in or for active antenna array beam calibration, are irrelevant to the actual invention. Therefore, they need not to be discussed in more detail here.

The exemplary radio system of FIG. 6 comprises a network node 601 of a network operator. The network node 601 may include e.g. an LTE base station of a macro cell (eNB), radio network controller (RNC), or any other network element, or a combination of network elements. The network node 601 may be connected to one or more core network (CN) elements (not shown in FIG. 6) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 6, the radio network node 201 that may also be called eNB (enhanced node-B, evolved node-B) or network apparatus of the radio system, hosts the functions for radio resource management in a public land mobile network.

FIG. 6 shows one or more user equipment 602 located in the service area of the radio network node 601. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smartphone, personal digital assistant (PDA), handset, laptop computer. In the example situation of FIG. 6, the user equipment 602 is capable of connecting to the radio network node 601 via a (cellular radio) connection 603.

Figure 7:
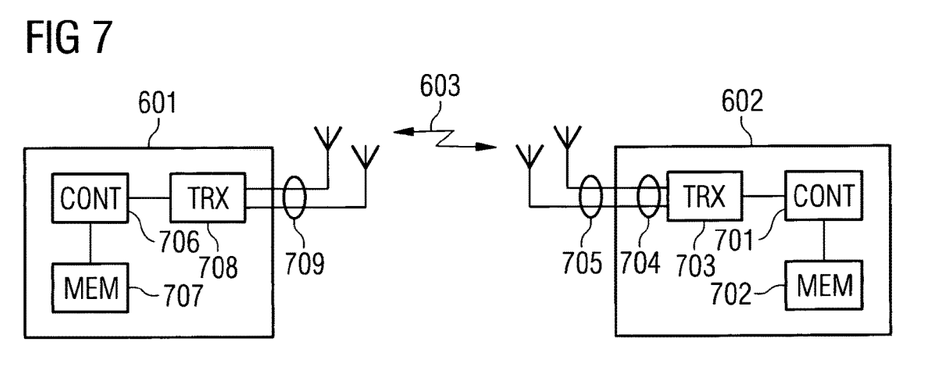
FIG. 7 shows a simplified block diagram illustrating exemplary apparatuses.

FIG. 7 is a block diagram of an apparatus according to an embodiment of the invention. FIG. 7 shows a user equipment 602 located in the area of a radio network node 601. The user equipment 602 is configured to be in connection 603 with the radio network node 601. The user equipment or UE 602 comprises a controller 701 operationally connected to a memory 702 and a transceiver 703. The controller 701 controls the operation of the user equipment 602. The memory 702 is configured to store software and data. The transceiver 703 is configured to set up and maintain a wireless connection 603 to the radio network node 601, respectively. The transceiver 703 is operationally connected to a set of antenna ports 704 connected to an antenna arrangement 705. The antenna arrangement 705 may comprise a set of antennas. The number of antennas may be one to four, for example. The number of antennas is not limited to any particular number. The user equipment 602 may also comprise various other components, such as a user interface, camera, and media player. They are not displayed in the figure due to simplicity.

The radio network node 601, such as an LTE (or LTE-A) base station (eNode-B, eNB) comprises a controller 706 operationally connected to a memory 707, and a transceiver 708. The controller 706 controls the operation of the radio network node 601. The memory 707 is configured to store software and data. The transceiver 708 is configured to set up and maintain a wireless connection to the user equipment 602 within the service area of the radio network node 601. The transceiver 708 is operationally connected to an antenna arrangement 709. The antenna arrangement 709 may comprise a set of antennas. The number of antennas may be two to four, for example. The number of antennas is not limited to any particular number. The radio network node 601 may be operationally connected (directly or indirectly) to another network element of the communication system, such as a further radio network node, radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface (not shown in FIG. 7). The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 601, 602 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 601, 602 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 702, 707 may include volatile and/or non-volatile memory and typically stores content, data, or the like. For example, the memory 702, 707 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 8:
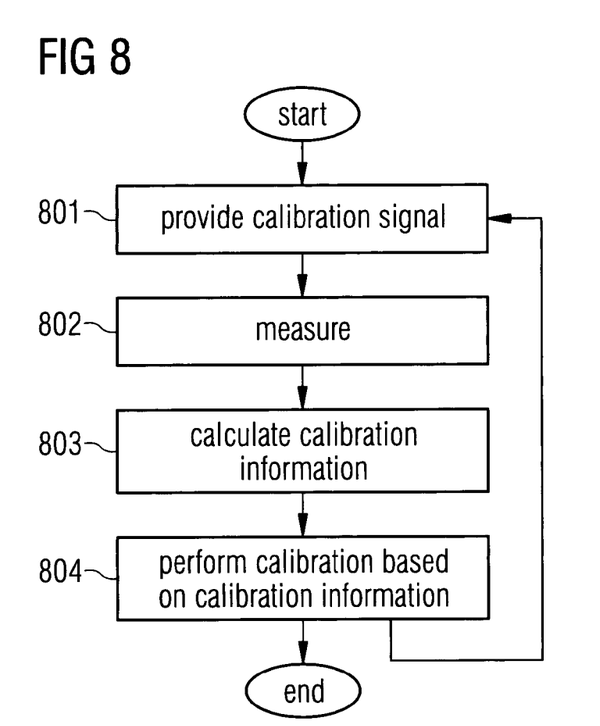
FIG. 8 shows a schematic diagram of a flow chart according to an exemplary embodiment of the invention.

FIG. 8 is a flow chart illustrating an exemplary embodiment. An apparatus which may comprise e.g. an apparatus implemented in a transceiver front end unit (transceiver front end module) as described above in connection with FIGS. 1 to 5, may, in item 801, drive calibration signals for antenna array beam calibration to an antenna array feeder line in the transceiver front end unit by using one or more directional couplers and/or radio frequency probes, wherein calibration signal paths are integrated inside the transceiver front end unit. In item 802, the apparatus may carry out measurements between different antenna combinations inside the antenna array. The apparatus may measure a strength of a radio frequency signal (i.e. the calibration signal). The strength may be measured as a power or as an absolute amplitude of the calibration signal. For example, based on a calibration signal correlation used, phase, delay and amplitude information may be measured in item 802. In item 803, based on collected measurement data, the apparatus may calculate calibration information for each measurement branch of the antenna array by using a mathematical formula (e.g. a formula based on a linear simultaneous equation). In item 804, the apparatus may perform active antenna array beam calibration based on the calculated calibration information. Thus, for a RX signal path, the apparatus may be configured to a) transmit 801, from one antenna in the active antenna array, a RX calibration signal, b) receive 802, 803, 804, in the other antennas in the active antenna array, the RX calibration signal, and repeat a) and b) until each (or predefined) antenna combination(s) in the active antenna array is calibrated. For a TX signal path, the apparatus may be configured to a) transmit 801, from one antenna in the active antenna array, a TX calibration signal, b) receive 802, 803, 804, in the other antennas in the active antenna array, the TX calibration signal, and repeat a) and b) until each (or predefined) antenna combination(s) in the active antenna array are calibrated.

During run time calibration, predefined antenna configurations over the "air", and also each TX and RX signal internal branches configuration inside the AAS front end module, need to be measured or solved.

After a sufficient amount of measurements have been carried out through the different branches, based on the linear simultaneous equation, it is possible to solve the leftover unknown factors' phase, delay and amplitude behaviour and finally calculate the required corrections.

The exemplary calibration process may be used both in TX and RX.

An exemplary embodiment may be implemented as a computer program comprising instructions for executing a computer process for active antenna array beam calibration. The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The steps/points, signalling messages and related functions described above in FIGS. 1 to 8 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for antenna calibration in communications, comprising driving calibration signals for antenna array beam calibration to an antenna array feeder line in a transceiver front end unit by using one or more directional couplers and/or radio frequency probes, wherein calibration signal paths are integrated inside the transceiver front end unit; carrying out measurements on the calibration signals between different antenna combinations inside the antenna array; based on collected measurement data, calculating calibration information for each measurement branch of the antenna array by using a mathematical formula; performing active antenna array beam calibration based on the calculated calibration information.

According to another exemplary embodiment, there is provided a method comprising using, for the antenna array beam calibration, same antennas as used for normal transceiver modes.

According to yet another exemplary embodiment, active antennas and/or antenna arrays are internally self-calibrated without external antennas or reflective elements outside of the transceiver front end unit.

According to yet another exemplary embodiment, an active antenna array comprises a specific number of antennas, wherein for a RX signal path, the method comprises steps of a) transmitting, from one antenna in the active antenna array, a RX calibration signal; b) receiving, in the other antennas in the active antenna array, the RX calibration signal; repeating steps a) and b) until predefined antenna combinations in the active antenna array is calibrated.

According to yet another exemplary embodiment, an active antenna array comprises a specific number of antennas, wherein for a TX signal path, the method comprises steps of a) transmitting, from one antenna in the active antenna array, a TX calibration signal; b) receiving, in the other antennas in the active antenna array, the TX calibration signal; repeating steps a) and b) until predefined antenna combinations in the active antenna array are calibrated.

According to yet another exemplary embodiment, the measurements carried out on the calibration signals comprise phase measurements, amplitude measurements and/or delay measurements.

According to yet another exemplary embodiment, the mathematical formula comprises a linear simultaneous equation.

According to yet another exemplary embodiment, there is provided a method comprising using the mathematical formula to calculate required corrections for the transceiver; using the calculated corrections to correct phase, amplitude and/or delay of a traffic signal respectively.

According to yet another exemplary embodiment, there is provided a method comprising using separate lines in the transceiver front end unit for TX calibration signals and RX calibration signals, such that a RX calibration signal is driven to the receiver chain via the radio frequency probe or directional coupler located between a RX filter and a low noise amplifier, and a TX calibration signal is driven to a third output port of a power amplifier protection circulator.

According to yet another exemplary embodiment, there is provided a method comprising using, for TX calibration signals and RX calibration signals, one common directional coupler or radio frequency probe connected via a switch to TX and RX calibration sources.

According to yet another exemplary embodiment, there is provided an apparatus comprising an arrangement for coupling a first antenna and a second antenna, a receiver operationally coupled to the first antenna, and a transmitter operationally coupled to the second antenna, wherein the transmitter being configured to drive calibration signals for antenna array beam calibration to an antenna array feeder line in a transceiver front end unit by using one or more directional couplers and/or radio frequency probes, wherein calibration signal paths are integrated inside the transceiver front end unit; the receiver being configured to carry out measurements on the calibration signals between different antenna combinations inside the antenna array; based on collected measurement data, calculate calibration information for each measurement branch of the antenna array by using a mathematical formula; and perform active antenna array beam calibration based on the calculated calibration information.

According to yet another exemplary embodiment, there is provided an apparatus configured to use, for the antenna array beam calibration, same antennas as used for normal transceiver modes.

According to yet another exemplary embodiment, there is provided an apparatus configured to internally self-calibrate active antennas and/or antenna arrays without external antennas or reflective elements outside of the transceiver front end unit.

According to yet another exemplary embodiment, an active antenna array comprises a specific number of antennas, wherein for a RX signal path, the apparatus is configured to a) transmit, from one antenna in the active antenna array, a RX calibration signal; b) receive, in the other antennas in the active antenna array, the RX calibration signal; repeat a) and b) until predefined antenna combinations in the active antenna array is calibrated.

According to yet another exemplary embodiment, an active antenna array comprises a specific number of antennas, wherein for a TX signal path, the apparatus is configured to a) transmit, from one antenna in the active antenna array, a TX calibration signal; b) receive, in the other antennas in the active antenna array, the TX calibration signal; repeat a) and b) until predefined antenna combinations in the active antenna array are calibrated.

According to yet another exemplary embodiment, there is provided an apparatus configured to use the mathematical formula to calculate required corrections for the transceiver; and use the calculated corrections to correct the phase, amplitude and/or delay of a traffic signal respectively.

According to yet another exemplary embodiment, there is provided an apparatus configured to use separate lines in the transceiver front end unit for TX calibration signals and RX calibration signals, such that a RX calibration signal is driven to the receiver chain via the radio frequency probe or directional coupler located between a RX filter and a low noise amplifier, and a TX calibration signal is driven to a third output port of a power amplifier protection circulator.

According to yet another exemplary embodiment, there is provided an apparatus configured to use, for TX calibration signals and RX calibration signals, one common directional coupler or radio frequency probe connected via a switch to TX and RX calibration sources.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

According to yet another exemplary embodiment, there is provided a transceiver comprising such an apparatus.

According to yet another exemplary embodiment, there is provided a network element comprising such a transceiver.

According to yet another exemplary embodiment, there is provided a user equipment comprising such a transceiver.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

ADC analogue-to-digital converter
DAC digital-to-analogue converter
RX receiver
TX transmitter
TRX transmitter-receiver (transceiver)
PA power amplifier
SW switch
LNA low noise amplifier
dvr driver
MIX mixer
MIMO multiple input multiple output

The invention claimed is:

1. A method for antenna calibration in communications, comprising:
in a radio module comprising a plurality of transceivers and a transmitter feedback receiver, each transceiver comprising a receiver and a transmitter coupled to at least one antenna of an antenna array, determining whether to calibrate receiver or transmitter calibration signal routes, and performing one of the following based on the determination:
in response to a determination to calibrate receiver calibration signal routes, driving receiver calibration signals for antenna array beam calibration through a first path in the radio module to a selected one of the at least one antennas corresponding to one of the transceivers, carrying out measurements on the receiver calibration signals using the receivers for all of the transceivers, and performing the driving the receiver calibration signals and the carrying out measurements on the receiver calibration signals between different antenna combinations of the antenna array; or in response to a determination to calibrate transmitter calibration signal routes, driving transmitter calibration signals for antenna array beam calibration through a second path, different from the first path, in the radio module to a selected one of the at least one antennas corresponding to one of the transceivers, carrying out measurements on transmitter calibration signals using a single transmitter feedback receiver for transmitter calibration signals from all of the transceivers, and performing the driving the transmitter calibration signals and the carrying out measurements on transmitter calibration signals between different antenna combinations of the antenna array;

based on collected measurement data, calculating calibration information for each measurement branch of the antenna array by using a mathematical formula; and performing active antenna array beam calibration based on the calculated calibration information.

2. A method according to claim 1, wherein the carrying out measurements on the receiver and transmitter calibration signals uses, for the antenna array beam calibration, same antennas as used for normal transceiver modes.

3. A method according to claim 1, wherein the antenna array is internally self-calibrated without external antennas or reflective elements outside of the radio module.

4. A method according to claim 1, wherein driving receiver calibration signals for antenna array beam calibration through a first path in the radio module comprises:

a) routing via a transmitter of one of the transceivers and then via a mixer a RX calibration signal to a selected at least one antenna in the antenna array;

b) receiving, in signal paths corresponding to the other at least one antennas in the antenna array, the RX calibration signal;

repeating a) to select different ones of the at least one antennas in the antenna arrays and repeating b) until predefined antenna combinations in the active antenna array are calibrated.

5. A method as claimed in claim 1, wherein driving transmitter calibration signals for antenna array beam calibration through a second path, different from the first path, in the radio module comprises:

a) routing via a transmitter of a selected one of the transceivers a TX calibration signal to a corresponding selected at least one of the antennas in the antenna array;

b) receiving, in the other at least one antennas in the antenna array, the TX calibration signal;

repeating a) to select different ones of the transmitters and their corresponding at least one antennas and repeating b) until predefined antenna combinations in the antenna array are calibrated.

6. A method as claimed in claim 1, wherein the measurements carried out on the receiver or transmitter calibration signals comprise phase measurements, amplitude measurements and/or delay measurements.

7. A method as claimed in claim 1, wherein the mathematical formula comprises a linear simultaneous equation.

8. A method as claimed in claim 1, wherein calculating calibration information further comprises:

using the mathematical formula to calculate required corrections for the transceiver; and using the calculated corrections to correct phase, amplitude and/or delay of a traffic signal.

9. A method as claimed in claim 1, wherein:

driving receiver calibration signals for antenna array beam calibration through a first path in the radio module further comprises driving a RX calibration signal to a receiver chain via a radio frequency probe or directional coupler located between a RX filter and a low noise amplifier in the first path, and driving transmitter calibration signals for antenna array beam calibration through a second path further comprises driving a TX calibration signal to a third output port of a power amplifier protection circulator in the second path.

10. A method as claimed in claim 1, wherein both the first path and the second path, for TX calibration signals and RX calibration signals, meet at one common directional coupler or radio frequency probe connected via a switch to TX and RX calibration sources.

11. An apparatus comprising:

a controller; and a radio module comprising a plurality of transceivers, each transceiver comprising a receiver and a transmitter able to be coupled to at least one antenna of an antenna array, the radio module configured by the controller to determine whether to calibrate receiver or transmitter calibration signal routes, and configured by the controller to perform one of the following based on the determination:

in response to a determination to calibrate receiver calibration signal routes, driving receiver calibration signals for antenna array beam calibration through a first path in the radio module to a selected one of the at least one antennas corresponding to one of the transceivers, carrying out measurements on the receiver calibration signals using the receivers for all of the transceivers, and performing the driving the receiver calibration signals and the carrying out measurements on the receiver calibration signals between different antenna combinations of the antenna array;

in response to a determination to calibrate transmitter calibration signal routes, driving transmitter calibration signals for antenna array beam calibration through a second path, different from the first path, in the radio module to a selected one of the at least one antennas corresponding to one of the transceivers, carrying out measurements on transmitter calibration signals using a single transmitter feedback receiver for transmitter calibration signals from all of the transceivers, and performing the driving the transmitter calibration signals and the carrying out measurements on transmitter calibration signals between different antenna combinations of the antenna array;

the controller configured, based on collected measurement data, to calculate calibration information for each measurement branch of the antenna array by using a mathematical formula; and the controller configured to perform active antenna array beam calibration based on the calculated calibration information.

12. An apparatus according to claim 11, wherein the carrying out measurements on the receiver and transmitter calibration signals uses, for the antenna array beam calibration, same antennas as used for normal transceiver modes.

13. An apparatus according to claim 11, wherein the antenna array is internally self-calibrated without external antennas or reflective elements outside of the radio module.

14. An apparatus according to claim 11, wherein the radio module comprises a mixer and wherein driving receiver calibration signals for antenna array beam calibration through a first path in the radio module comprises:
   a) routing via a transmitter of one of the transceivers and then via a mixer a RX calibration signal to a signal path for a selected at least one antenna in the antenna array;
   b) receive, in signal paths corresponding to the other antennas in the active antenna array, the RX calibration signal;
   repeat a) to select different paths corresponding to different ones of the at least one antennas in the antenna and repeat b) until predefined antenna combinations in the antenna array are calibrated.

15. An apparatus as claimed in claim 11, wherein driving transmitter calibration signals for antenna array beam calibration through a second path, different from the first path, in the radio module comprises:
   a) routing via a transmitter of a selected one of the transceivers a TX calibration signal to a corresponding selected at least one of the antennas in the antenna array;
   b) receive, in signal paths corresponding to the other at least one antennas in the antenna array, the TX calibration signal;
   repeat a) to select different signal paths and their corresponding different ones of the at least one antennas in the antenna arrays and repeating b) until predefined antenna combinations in the active antenna array are calibrated.

16. An apparatus as claimed in claim 11, wherein the measurements carried out on the receiver or transmitter calibration signals comprise phase measurements, amplitude measurements and/or delay measurements.

17. An apparatus as claimed in claim 11, wherein the mathematical formula comprises a linear simultaneous equation.

18. An apparatus as claimed in claim 11, wherein calculating calibration information further comprises:
   use the mathematical formula to calculate required corrections for the transceiver; and
   use the calculated corrections to correct the phase, amplitude and/or delay of a traffic signal.

19. An apparatus as claimed in claim 11, wherein the radio module comprises a receiver chain, one of a radio frequency probe or directional coupled, a RX filter, a low noise amplifier, and power amplifier protection circulator, wherein:
   driving receiver calibration signals for antenna array beam calibration through a first path in the radio module further comprises driving a RX calibration signal to a receiver chain via a radio frequency probe or directional coupler located between a RX filter and a low noise amplifier in the first path, and
   driving transmitter calibration signals for antenna array beam calibration through a second path further comprises driving a TX calibration signal is driven to a third output port of a power amplifier protection circulator in the second path.

20. An apparatus as claimed in claim 11, wherein the radio module comprises one of common directional coupler or radio frequency probe and a switch, and wherein both the first path and the second path for TX calibration signals and RX calibration signals, meet at one common directional coupler or radio frequency probe connected via a switch to TX and RX calibration sources.

21. A computer program product comprising a non-transitory computer-readable storage medium, comprising program code configured to cause an apparatus to perform at least the following:
   in a radio module comprising a plurality of transceivers and a transmitter feedback receiver, each transceiver comprising a receiver and a transmitter coupled to at least one antenna of an antenna array, determining whether to calibrate receiver or transmitter calibration signal routes, and performing one of the following based on the determination:
      in response to a determination to calibrate receiver calibration signal routes, driving receiver calibration signals for antenna array beam calibration through a first path in the radio module to a selected one of the at least one antennas corresponding to one of the transceivers, carrying out measurements on the receiver calibration signals using the receivers for all of the transceivers, and performing the driving the receiver calibration signals and the carrying out measurements on the receiver calibration signals between different antenna combinations of the antenna array; or
      in response to a determination to calibrate transmitter calibration signal routes, driving transmitter calibration signals for antenna array beam calibration through a second path, different from the first path, in the radio module to a selected one of the at least one antennas corresponding to one of the transceivers, carrying out measurements on transmitter calibration signals using a single transmitter feedback receiver for transmitter calibration signals from all of the transceivers, and performing the driving the transmitter calibration signals and the carrying out measurements on transmitter calibration signals between different antenna combinations of the antenna array;
   based on collected measurement data, calculating calibration information for each measurement branch of the antenna array by using a mathematical formula; and
   performing active antenna array beam calibration based on the calculated calibration information.

22. A transceiver, comprising an apparatus according to claim 11.

23. A network element, comprising a transceiver of claim 22.

24. A user equipment, comprising a transceiver of claim 22.

25. An apparatus as claimed in claim 11, wherein the controller comprises a processor, and the apparatus further comprises a memory comprising computer program code, and wherein the processor, in response to executing the computer program code, configures the radio module to perform at least the determining, driving the receiver calibration signals, driving the transmitter calibration signals, calculating calibration information, and the performing active antenna array beam calibration.

* * * * *

UNITED STATES PATENT AND TRADEMARK OFFICE
CERTIFICATE OF CORRECTION

PATENT NO. : 10,164,334 B2
APPLICATION NO. : 14/784409
DATED : December 25, 2018
INVENTOR(S) : Jukka Kareisto and Eero Olavi Heikkinen It is certified that error appears in the above-identified patent and that said Letters Patent is hereby corrected as shown below:

In the Claims

Claim 4:
Column 13, Line 42, "active" should be deleted.

Claim 15:
Column 15, Line 32, "active" should be deleted.

Signed and Sealed this
Nineteenth Day of February, 2019

Andrei Iancu
*Director of the United States Patent and Trademark Office*